Nov. 5, 1963  J. A. SEINER  3,109,833
CONSERVING POLYOL IN FUSION COOKING OF POLYMERIC POLYESTERS
Filed Nov. 14, 1960
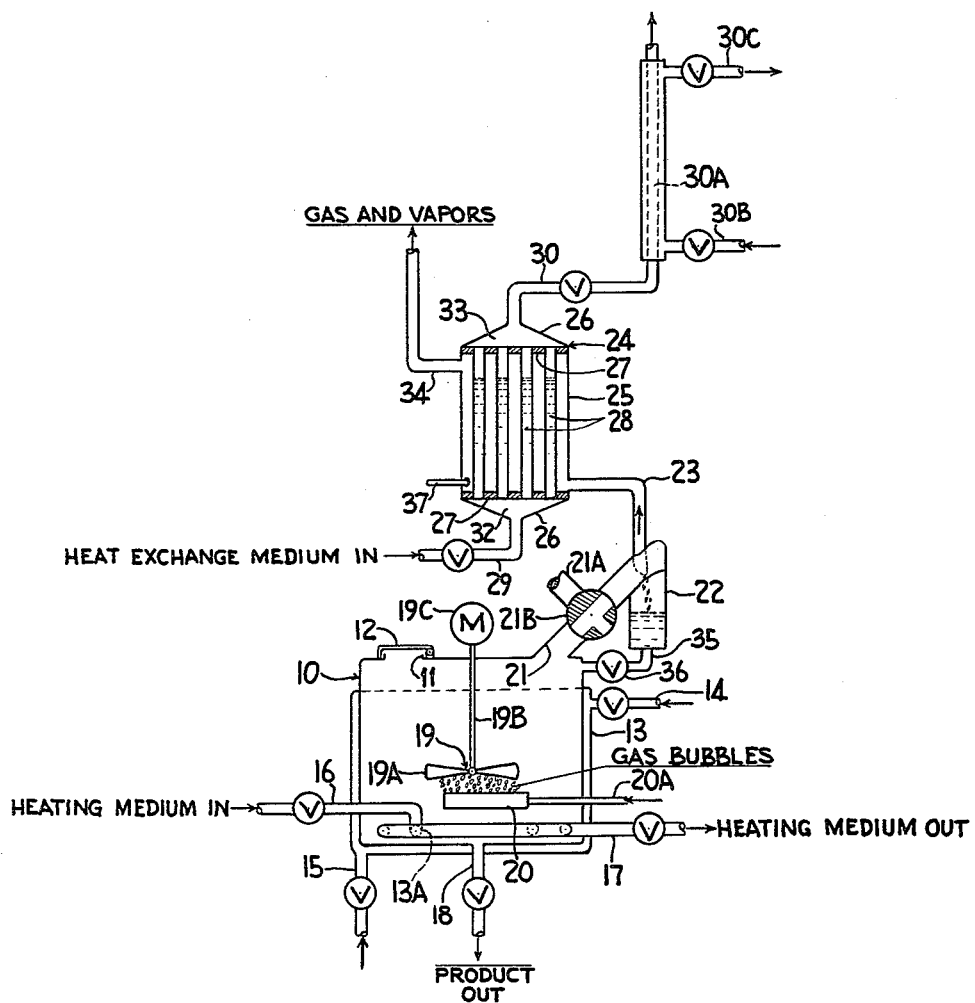
INVENTOR.
JEROME A. SEINER
BY Oscar L. Spencer
ATTORNEY

United States Patent Office 3,109,833
Patented Nov. 5, 1963

3,109,833
CONSERVING POLYOL IN FUSION COOKING
OF POLYMERIC POLYESTERS
Jerome A. Seiner, Pittsburgh, Pa., assignor to Pittsburgh
Plate Glass Company, Pittsburgh, Pa., a corporation
of Pennsylvania
Filed Nov. 14, 1960, Ser. No. 68,990
5 Claims. (Cl. 260—75)

This invention relates to a method of preparing a polyester of a dicarboxylic acid and a polyol, and it has particular relation to a method whereby the loss of polyol component due to volatilization in the reactor is reduced or eliminated, and whereby reaction times are substantially reduced.

It has heretofore been disclosed to prepare polyesters of dicarboxylic acids, such as one of the isomeric phthalic acids or an anhydride thereof, or a mixture thereof, with an alpha, beta-ethylenically unsaturated acid, such as maleic acid (or its anhydride) or fumaric acid, and a polyol, such as propylene glycol, by heating the mixture to produce esterification with concomitant evolution of water. In the event that an anhydride of a dicarboxylic acid is employed as the source of the acid, the reaction may be regarded as proceeding in stages as follows:

STAGE I

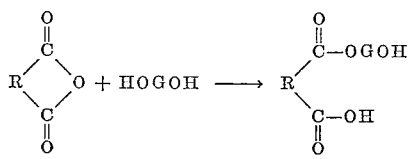

In this stage, no water is evolved, the anhydride ring being merely split to form a partial ester in which one of the carboxyls of the acid and one of the hydroxyls of the polyol component remain unreacted. If the resultant partial ester is further heated, the terminal hydroxyl and terminal carboxyl of contiguous molecules enter into reaction to form chains, which may be approximately represented by the formula:

STAGE II

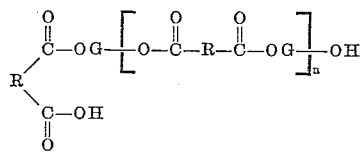

R and G being respectively organic moieties in a carboxylic acid and a polyol, $n$ being a number from 1 to about 500, or sometimes more, dependent upon molecular weight of the polyester. Simultaneously, water is liberated. When the ratio of polyol to acid is high, some molecules of polyester may have the formula:

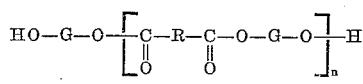

R, G and $n$ having the significance previously given.

In the event that the free acid is employed in the reaction, the liberation of water begins immediately with the esterification reaction, as indicated by the equation:

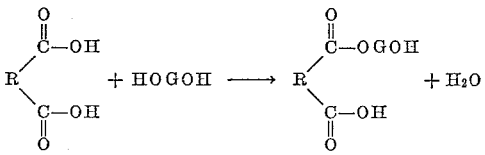

As the reaction proceeds to form chains comprising alternate acid and polyol residues, more water is evolved, as in the preceding equations.

Since the foregoing reactions are reversible, it is necessary to remove the evolved water from the reaction zone as it is formed if a reasonable degree of completion of reaction within a reasonable time is to be attained. To facilitate this removal of water, a solvent for the reactants which is a non-solvent for the water has often been added (usually in small amount). As the reaction proceeds, the solvent boils off and the vapor thereof carries away most of the water substantially as it is evolved. In conventional practice, the vapors of water and solvent have been condensed and separated in a suitable trap, the water being discarded and the solvent being returned to the reactor (at least so long as solvent is required in the latter).

This process has been found to be objectionable in certain respects. For example, it has been found that appreciable quantities of many of the polyols are volatilized and carried out of the reactor in the vapor mixture from the latter. The polyol is condensed with the water of reaction in the condenser and has been discarded to the sewer. Although the concentration thereof in the discarded water is low, the total amount thereof is often a substantial percentage of the polyol introduced into the reactor. If reasonably low acid values are to be attained, it is necessary to add excess polyol to the reactor to compensate for this loss.

In addition to being wasteful of polyol, the conventional techniques of polyester resin production, in spite of the fact that they do effect removal of water from the reaction zone, tend to be quite slow and therefore expensive from the standpoint of heat requirements.

In U.S. Patent 2,892,813 to Wavering et al., it has been disclosed to improve the performance of the conventional esterification reaction by the provision of a column upon the reactor. In the apparatus as disclosed in the patent, the column is provided at the top thereof with means for supplying water thereto in order to form an azeotropic mixture of vapors of water and solvent, while keeping the lower portions of the column relatively hot in order to prevent the return of water downwardly from the column to the reaction zone. In this process, the vapors of water and solvent pass out of the column as an azeotropic mixture, thus effectively eliminating the water from the system. The polyol, which does not form an azeotrope, is condensed and passes back down through the hot portion of the column to the reactor with but little or no return of water.

The azeotropic mixture of water and solvent vapors from the top of the column are condensed and the resultant liquid condensate is subjected to separation into phases, the solvent phase being returned to the reactor. Such part of water as is required may be put back into the top of the column to facilitate maintenance of azeotropic conditions. Such water as is not required in the latter operation is discarded with but little loss of polyol component therein. In the patented process it has also been disclosed to blow the reaction mixture with inert gas and to take the vapor mixture from the top of the column at a temperature above the boiling point of water.

Concomitantly with the conservation of polyol from the reactor in the foregoing processes, it has also been observed that there is some degree of speed-up in the reaction, thus increasing the out-put of the apparatus and saving on heat requirements. The reaction time is still fairly long, often extending over a period of about 15 to about 17 hours, or longer in certain instances.

This invention contemplates the provision of a fusion process of cooking polyesters wherein the use of a solvent is not required, the loss of a polyol as vapors from the reactor, however, being reduced and concurrently the rate of reaction is greatly speeded up, often to such degree that cooking time is divided in half or even further reduced.

In accordance with the provisions of this invention, these and other advantages are attained by application of the following steps:

(A) The reaction of esterification between the polyol and the dicarboxylic acid is conducted as a fusion process in a reactor without the inclusion of a liquid solvent or diluent, but with a relatively heavy flow of a non-reactive gas designed to sweep out water as a vapor and thus to remove it from the reaction zone.

(B) The mixture of gas and vapors from the reactor is passed directly from the reactor to a partial condenser which is operated at a temperature sufficient to maintain substantially all of the water from the polyesterification reaction in the gas-vapor mixture in vapor phase while condensing out the polyol vapors and returning the condensed polyol to the reactor to maintain the concentration thereof in the reaction mixture substantially at constant ratio with respect to the dicarboxylic acid and/or anhydride component.

For a better understanding of the invention, reference may now be had to the accompanying drawing, in which the single FIGURE is a diagrammatical representation of apparatus suitable for use in the practice of the invention.

In this apparatus is provided a suitable reaction vessel, such as a reactor 10 having charging means represented by hatch 11 with a lid 12 that will allow raw materials to be introduced into the vessl prior to starting the reaction run or during the run, as may be required. Any means which will transfer energy to the reaction vessel may be employed to heat the same. Examples of such means are represented by direct gas fire applied to the vessel, radiant heat, direct electrical heat, circulating fluids, such as Aroclor, condensing vapors such as Dowtherm, or steam and the like. For purposes of illustration, the reactor is disclosed as being provided with dual heating means; namely, a heating jacket 13 and an internal heating coil 13A, through which heating media such as one of those mentioned above may be circulated. Heat may be supplied to the jacket and the coil alternately or concurrently, as may be desired. The jacket and coil are provided with appropriate inlets and outlets indicated, respectively, at 14, 15, 16 and 17. The reactor is also provided with an outlet 18 for discharge of ester product. Obviously, the several inlets and outlets may be provided with valves designated schematically at V, by means of which the flow of fluids may be regulated.

Means to agitate the charge within the reactor comprises a mechanical stirrer 19 with a head 19A, a shaft 19B and a motor 19C. The reactor is also provided with a distributor head 20 disposed directly below the agitator and being provided with a multiplicity of small openings, not shown, which discharge a flow of inert gas from conduit or tube 20 in order to bubble the gas upwardly through the mixture and thus to remove the water of reaction as it is formed. It will be observed that the agitator is so disposed that there is a substantial whipping action exerted upon the bubbles of gas as they arise through the esterification mixture, thus tending further to break up the bubbles and to produce more effective contact between the latter and the liquid mixture.

The reactor 10 is further connected with a vapor line 21 which extends directly from the reactor to the trap 22, the function of which will subsequently be more fully explained. The line 21 is also provided with a branch 21A venting the gases directly to the atmosphere when desired. A three-way valve 21B provides means whereby the flow of the gases and vapors may be switched from the line 21 to branch 21A whenever desired.

From the trap, the vapors and gases from the reactor are conducted by line 23 to a partial condenser 24. Although the lines 21 and 23 are interrupted by the trap 22, the interruption is but slight and it will be apparent that the mixture of gases and vapors is carried practically directly from the reactor 10 to a partial condenser 24. The latter has an outer shell 25 and conical end closures 26. Within the closed shell thus formed are disposed spaced tube sheets 27, perforated for the ends of tubes 28, the latter of which are filled with heat exchange medium, which may be water or other fluid at proper temperature. The heat exchange medium within the tubes 28 may function either to heat or to cool the partial condenser, dependent upon the phase of the reaction, as hereinafter more fully discussed. Inlet conduit 29 and outlet conduit 30 provide means for circulating heat exchange medium to the conical header chambers 32 and 33 between the end closures 26 and the tube sheets 27, and from these chambers the heat exchange fluid is distributed to the tubes.

Conduit 34 provides an outlet for discharging uncondensed components, such as inert gas, water vapors, and any other uncondensed vapors that may enter the shell of the partial condenser.

Liquid polyol collects above the lower tube sheet 27 and from thence it trickles as a relatively thin film down the inner surface of the conduit 23 countercurrently to the upward flow of hot gases and vapors from the reactor 10. These gases and vapors tend to strip out any water absorbed in the polyol film upon the tube 23. If desired, the polyol could be allowed to trickle directly back to the reactor 10, but as shown in the drawings, it is temporarily collected in the trap 22 from which it is drawn off to the reactor continuously or intermittently by a conduit 35 having valve 36, by means of which the flow can be shut off from time to time or regulated, as may be desired.

One or more thermometers 37 or other temperature measuring devices may be mounted in the partial condenser for determining the temperature of the latter or of portions thereof, as may be required. The temperature may be adjusted to maintain the desired range by adjusting the flow of heat transfer medium to the partial condenser.

In the operation of the apparatus illustrated, the reactor 10 is charged with a fusion mixture consisting essentially of one or more polyols and a dicarboxylic acid or anhydride thereof, or one of the possible mixtures of acids or anhydrides, or mixtures of acids and anhydrides, such as are more fully illustrated hereinafter, the charge being introduced through the inlet 11. It is preferred that the partial condenser 24 be appropriately heated to a temperature which will insure that any water vapors reaching the partial condenser will pass through without condensation and without attendant return of water through the conduits 23 and 21 to the reactor. Preliminary warming of the partial condenser to the desired temperature may be effected by flowing of steam or other heated fluid through the inlet 29 and outlet 30. The temperature of the partial condenser, therefore, should be maintained at a value somewhat above the boiling point of water; namely, within a range of about 213° F. to about 240° F. At these temperature ranges, water vapors reaching the partial condenser will pass out through the conduit 34 while polyol carried in the gas as vapor mixture will be condensed out to trickle back through the conduit 23.

When condenser 24 is hot and vapors from the reactor are passing through the condenser, the tubes are filled with hot liquid medium. Water is an especially effective heat transfer medium for the tubes 28 inasmuch as it boils at about 212° F. and so long as the tubes 28 are filled or partially filled therewith, the temperature within the partial condenser will automatically adjust itself substantially to the desired range. Usually, the temperature in the partial condenser will be somewhat higher than that of the water in the tubes. By restricting the amount of water in the tubes, the temperature of the vapors in the partial condenser can be increased. The temperature might also be increased by partially closing the valve in the outlet conduit 30 to give a back pressure in the condenser. As water is boiled away in the tubes 28, additions may be made thereto from time to time as may be desired, for example, by opening the valve in the line 29. Obviously, other heat transfer media, either boiling or non-boiling, may be used to maintain the temperature in the partial condenser. The Aroclor or Dowtherm previously mentioned may be used for this purpose if so desired. If the heat exchange medium is a volatile liquid, such as water, which cools the partial condenser by vaporization, it is desirable that the outlet conduit 30 be provided with a suitable condenser, such as tube condenser 30A having an inlet 30B and outlet 30C, for secondary coolant. This condenser recovers any vapors of the coolant from the partial condenser and returns them to the partial condenser, thus reducing or eliminating requirements for make-up coolant. If water is used to cool the partial condenser, the tendency to accumulate scale in the partial condenser is reduced or eliminated.

In the practice of the present invention, various polyesters including different components may be prepared by the fusion process herein disclosed. The preferred polyols employed in the preparation of these polyesters are usually glycols, many of which tend to be volatile and therefore to escape rapidly from the reactor. This is especially true of glycols, the organic portions of which are hydrocarbons, i.e., without ether linkages. These glycols include ethylene glycol, propylene glycol and butylene glycol, and the like. The ether type of glycol, such as diethylene glycol and dipropylene glycol, also tends to escape to some extent, though not to such degree as the foregoing polyols. Other polyols which are also sometimes lost to some degree comprise tripropylene glycol, triethylene glycol and glycerine. The present invention may be applied in the preparation of any of the polyesters wherein these or other polyols, singly or in admixture with each other, are used.

Likewise, the fusion system herein disclosed is applicable to the preparation of polyesters using various polycarboxylic acids. The term "acids" as herein used also includes the anhydrides thereof where the latter exist. Obviously, the anhydrides are often preferred in the reaction because they tend to react to form esters more rapidly than do the free acids and during the early ring-breaking stages, do not evolve substantial amounts of water. The following are typical anhydrides which may be used in the reaction:

Maleic anhydride
Phthalic anhydride
Endomethylenetetrachlorophthalic anhydride
Tetrachlorophthalic anhydride
Tetrahydrophthalic anhydride
Succinic anhydride The following are typical free acids which may be used in the reaction:

Adipic acid
Isophthalic acid
Terephthalic acid
Fumaric acid
Maleic acid
Succinic acid Obviously, mixtures of free acids and anhydrides, or two or more anhydrides, or two or more free acids may be used in the reaction.

In the reaction, various inert or nonreactive gases may be used to sparge the reaction mixture and thus to remove water therefrom. Carbon dioxide constitutes one such gas. Likewise, nitrogen may be employed. Preferred gases comprise combustion gases, such as are obtained by burning a fuel gas or a gaseous hydrocarbon with air to form a mixture consisting largely of carbon dioxide and nitrogen with perhaps some carbon monoxide and minor amounts of other gaseous constituents, such as oxygen. In conducting the reaction, it is preferred that the esterification components be introduced into the reactor and in the event that the anhydrides of the acids are employed without substantial amounts of free acids, the use of inert gas to remove water during the initial stages of esterification as represented in the previously given formulae is not required.

In conducting the reaction through the main water-producing stages, the gas may be supplied at such rate as will remove the water from the reactor and will further carry the water from the top of the partial condenser under its own partial pressure at the temperature existing in the latter region and at a rate that will keep the bottom of the partial condenser hot and free from returning water. A useful formula for determining the rate of gas flow during the main part of the reaction is as follows:

$$C.f.m. = 4 + K\ G$$

wherein c.f.m. indicates cubic feet of gas flow per minute, $K$ is a number from about 0.001 to about 0.040, in most instances, it is about 0.016, and $G$ indicates the gallons of reaction mixture. Thus, for a 1000-gallon reactor, the formula indicates a flow of inert gas $$(c.f.m.) = 4 + 16 = 20\ C.F.M.$$

This rate for a 1000-gallon batch may be varied substantially, for example, by about 50 percent either way, though it is considered that the rate of about 20 cubic feet per minute is near the optimum for the reaction mixture normally charged to a 1000-gallon reactor. If the rate of gas flow is unduly reduced, it will be evident that the volume of gas will be insufficient to carry all of the water from the reactor. For example, if a flow rate of 0.5 cubic feet of gas per minute were substituted for the previously calculated 20 cubic feet per minute, the reaction time would be considerably longer due to poor water removal. If the gas flow is unduly increased during the main cooking stage, it will be apparent that there may be a tendency for the mixture to foam and there will be an undue over-carry of the polyol component in the vapors passing from the top of the reactor.

With the smaller sizes of reactors, e.g., below about 300 gallons capacity, the foregoing formula may tend to call for a higher rate of gas flow than is absolutely necessary owing to the large value of the constant 4. However, even with reactors as small as 25 gallons, the gas flow will not be below about 0.5 cubic feet per minute. The flow seldom will exceed $4.0 + 0.04\ G$ ($G$ being gallons of batch) until most of the polyol components has been at least partly reacted with the acid component.

At the conclusion of the main reaction when substantially all of the glycol is tied into the polyester and the evolution of water has slowed down, the sparge rate may be increased in order more completely to carry the reaction to completion and thoroughly to remove water from the polyester product. For example, the gas flow for a 1000-gallon batch may be increased to about 40 or 60 cubic feet per minute and may be carried even higher, though, of course, excessive use of sparging gas during the final stages of the reaction tends to be uneconomical.

It will be recognized that inert gases from the reaction may be passed to the stack after they have passed through the partial condenser, or they may be subjected to recovery treatment, as for example, by removal of water vapor and perhaps other impurities therefrom, after which they may be reused for other purposes as desired. It will be obvious that in those instances wherein the gases are not reused, they may be allowed to escape from the partial condenser to the atmosphere without condensing out the water.

At that stage of the reaction when substantially all of the volatile materials, such as water of reaction and polyol, have been removed, the flow of sparging gas may be switched from conduit 21 and trap 22 by operating valve 21B to direct the flow to conduit 21A, from whence it is conducted to the atmosphere, or is otherwise disposed of. Likewise, by conducting the vapor lines 21 of two or even three reactors 10 into a common trap 22 connected to a common partial condenser 24, it is possible to so synchronize the cooking phase of one reactor that essentially dry and warm sparging gas from the branch 21A during the late stages of reaction can be directed through an appropriate connection with line or lines 20A to sweep the water from the companion reactor or reactors operating at a stage in which water is being rapidly evolved. Inert gas is thus conserved and a certain amount of heat from one batch may be reused in another. Also, the time of the partial condenser is more fully utilized.

The following constitute examples illustrating the practice of the present invention.

*Example I*

In accordance with the provisions of this example, a reaction mixture was prepared comprising equal moles of maleic anhydride and phthalic anhydride, to which were added sufficient moles of propylene glycol to afford approximately a 5 percent excess over that which would be required for a stoichiometric polyesterification reaction.

The charge as a fusion mixture was introduced into the reactor 10, the trap 22 was filled to an appropriate level with propylene glycol, and the partial condenser 24 was heated to a temperature which would assure that no water vapors from the reactor would be condensed and returned to the latter during the early stages of the reaction before the vapor mixture from the reactor had sufficient time to heat the partial condenser to the desired temperature.

The foregoing esterification mixture in an amount of 1000 gallons was introduced into the reactor 10 as shown in the drawings, no solvent being included in the mixture. Flow of inert gas through the reaction mixture was initiated at a reduced rate of 2 cubic feet per minute. This slow rate of flow was admissible at this phase of the reaction inasmuch as but little or no water was evolved during the initial stages of the reaction.

The temperature was increased rapidly to about 200° F., at which point active reaction was indicated by an exothermal rise. The application of heat may then be temporarily discontinued, for example, for about 20 minutes, though this is not essential particularly in the instance of small batches.

At the conclusion of the exothermal rise (at about 315° F.) the flow of inert gas (combustion gas) was adjusted to about 20 cubic feet per minute and was maintained during the remainder of the active reaction in order to remove water substantially as it is formed. This same rate may be used from the beginning, though it is higher than necessary and therefore, it is more economical to reduce the same. This is especially true where the anhydrides of the acids are used. During the course of the warm-up and during the subsequent stages of the reaction, the agitator 19 was operated in order to effect rapid circulation of the esterification mixture and thus to improve heat transfer. Also, the agitation tended to break up the bubbles of gas as they passed upwardly through the blades of the agitator head 19A.

Heat was supplied to the fusion mixture in the reactor as fast as practicable and the temperature rose as the esterification reaction progressed. After the anhydride rings were broken, the reaction was accompanied by evolution of substantial amounts of water which were carried away from the reaction zone in the gas stream passing upwardly through the conduit 21, the trap 22 and the conduit 23 to the partial condenser 24. The gases as they left the reactor were substantially at the temperature of the reaction mixture, that is to say, at a temperaure which progressively increased from abou 75° F. to about 430° F. during the final stages of the reaction. The gas-vapor mixture was but slightly cooled in its upward passage to the partial condenser 24, but after it entered the latter, the high heat transfer efficiency of the latter resulted in rapid cooling with resultant condensation of any polyol vapors carried in the gas-vapor mixture. Gases and vapors which were not condensed were allowed to escape from the partial condenser through the conduit 34. The polyol component which was condensed out collected in a shallow pool upon the top of the lower tube sheet 27, from whence it trickled as a thin film down the sides of the conduit 23 into the trap 22, from whence it was discharged back to the reactor 10, thus maintaining the desired concentration of the polyol in the reaction mixture.

As the esterification neared completion and nearly all of the hydroxyl groups of the polyol had been reacted into the polyester product, the temperature of the reactor was increased to a maximum of about 430° F. and owing to the decrease in the volatile matter, such as water vapor and glycol, the temperature in the partial condenser tended to drop. This constituted an indication that the propylene glycol was all reacted with the dicarboxylic acid and most of the water had been evolved. At this stage, the acid number of the polyester product from the reactor was about 63 and the viscosity was about F on the Gardner-Holdt scale, in a test sample comprising 60 percent solids in monoethyl ether of ethylene glycol and at a temperature of about 77° F. At this stage, the sparging rate with the inert gas was increased to 40–60 cubic feet per minute. The product was thus thoroughly dried and the esterification reaction was carried to its final stages and the acid number and viscosity desired in the final product were attained. During the final stages of the sparging operation, frequent checks of acid number and viscosity of the product were made until it was considered that the preparation of the polyester was complete. At this time the readings were:

Acid number _____ 51
Viscosity (Gardner-Holdt) _____ H

The polyester was then discharged from the reactor and cooled below about 250° F. for the addition of monomer, such as styrene. The incorporation of the monomer and the subsequent use of the resultant interpolymerizable mixture is not a feature of the present invention and need not be described.

The log of the esterification run was as follows:

| Time in hours | Event |
|---|---|
| 0:00 | Inert gas and heat on, gas flow 2 c.f.m., subsurface. |
| 1:05 | Exothermal rise at 200° F., heat off, subsurface gas flow off. |
| 1:25 | Heat on at 315° F., gas flow on at 20 c.f.m., subsurface. |
| 5:00 | Acid value 63, viscosity F. |
| 5:15 | Sparging rate increased, vented to atmosphere. |
| 6:00 | Acid value 51, viscosity H+. |
| 6:20 | Started discharging batch. |

The esterification times in this example and by the solvent method as disclosed in the Wavering et al. patent are compared as follows:

|  | Non-solvent method | Solvent method |
|---|---|---|
| Esterification time | 6 hrs., 20 min | 10 hrs., 42 min. |

The saving in time using the present method was 4 hours and 22 minutes.

The foregoing constitutes a typical reaction under the provisions of the present invention. It will be manifest that the amounts of batch may be increased or decreased to meet the individual requirements of the operator. The ratio of inert gas may be increased or decreased, for example, in a range of about 5 to about 44 cubic feet per minute for a 1000-gallon reactor.

It will be apparent that various esterifiable mixtures may be reacted in the apparatus and allowing for individual difference of the individual mixtures, substantially the same procedures as given in the foregoing example may be used.

*Example II*

In accordance with this example, an esterifiable mixture was prepared comprising:

| | Moles |
|---|---|
| Maleic anhydride | 10 |
| Diethylene glycol | 12 |

These components were pre-esterified to an acid value in a range of about 25 to 30 and to the resultant polyester were added:

| | Moles |
|---|---|
| Phthalic anhydride | 10 |
| Propylene glycol | 8.8 |

The resultant mixture in an amount of about 1000 gallons was then further esterified in the apparatus illustrated in the drawings and using the techniques described in Example I, the temperature of the partial condenser being maintained in a range of about 213° F. to about 240° F. by water boiling in the tubes 28. In the cooking operation after the exothermal rise characterizing the initial stages of esterification, the mixture was sparged with inert gas at a rate of 20 cubic feet per minute and cooking was continued until a final acid number of 25 to 35 was attained. The maximum temperature was about 430° F.

The total time of esterification in this example and the corresponding esterification time for preparing the same polyester in a like amount but by the techniques and apparatus of the foregoing patent to Wavering et al. and using xylene as a solvent, are compared as follows:

| | Non-solvent Method | Solvent Method |
|---|---|---|
| Esterification time | 10 hrs., 25 min. | 17 hrs., 25 min. |

A saving of 7 hours in cooking time was thus obtained. The polyester product obtained was highly satisfactory from the standpoint of color and other characteristics, and the product was well adapted for blending with monomers, such as styrene, to provide mixtures which could be cured into hard, thermoset resins.

*Example III*

In this example, an esterifiable mixture was prepared comprising:

| | Moles |
|---|---|
| Propylene glycol | 11 |
| Isophthalic acid | 6 |
| Maleic anhydride | 4 |

A 1000-gallon quantity of this mixture was cooked in the apparatus as illustrated in the drawings. During the main part of the cooking operation, the partial condenser 24 was cooled with water which was allowed to boil to maintain the desired temperature in the partial condenser. After the exothermal rise in the esterfication mixture, the latter was subjected to sparging with inert gas at a rate of 20 cubic feet per minute until the evolution of water substantially ceased and substantially all of the propylene glycol had reacted with the acid components. At this stage, the rate of sparging was increased to 40–60 cubic feet per minute. The maximum temperature attained was about 460° F. Sparging was continued until a Gardner-Holdt viscosity of T–V at a concentration of 60 percent of the polyester in the monoethyl ether of ethylene glycol was attained.

It will be recognized that this is a difficult esterification reaction and there is a considerable requirement for excess glycol, even when the techniques of the Wavering et al. patent are used in the reaction. A substantial saving in propylene glycol and in cooking time is attained by use of the techniques of this invention. The comparative reaction times and requirements in excess propylene glycol using the techniques of the present invention and the techniques of the solvent method are tabulated as follows:

| | Non-solvent Method | Solvent Method |
|---|---|---|
| Time | 11 hrs., 50 min. | 25 hrs. |
| Excess propylene glycol | 10–15 percent | 17–20 percent. |

The time required using the techniques of this invention was therefore less than half that required using the techniques of the solvent method. The saving in excess propylene glycol was 41 to 60 percent based upon the excess used in the process.

*Example IV*

In accordance with this example, an esterifiable mixture was prepared comprising:

| | Moles |
|---|---|
| Phthalic anhydride | 3 |
| Maleic anhydride | 2 |
| Propylene glycol | 4.1 |
| Diethylene glycol | 1.4 |

This mixture in an amount of 1000 gallons was cooked in the apparatus illustrated in the drawings following the techniques described in Example I. After the initial exothermal rise, the mixture was sparged with combustion gas flowing through the mixture as a rate of 20 cubic feet per minute and being uniformly distributed therein by the agitator 19. The reaction was continued until desired acid number and viscosity were attained; namely, an acid number of about 38 and a viscosity on the Gardner-Holdt scale of F in a 60 percent solution in monoethyl of ethylene glycol.

The comparison of the reaction time using the method of this invention and the solvent method as disclosed in the Wavering et al. patent are compared as follows:

| | Non-solvent Method | Solvent Method |
|---|---|---|
| Time of reaction | 6 hrs., 40 min. | 9 hrs., 21 min. |

The apparatus and techniques disclosed in these examples may be applied to the preparation of polyesters of other polyols and other dicarboxylic acids and/or anhydrides as described.

While specific examples of the invention have been set forth hereinabove, it is not intended to limit the invention solely thereto, but to include all of the variations and modifications falling within the scope of the appended claims.

Reference is made to applicant's commonly owned applications respectively entitled "Fast Cook Fusion Polyester Technique" and "Preparation of Polyesters," filed of even date herewith and having Serial Nos. 69,988 and 68,989, respectively.

I claim:

1. A method of preparing a polymeric polyester from an esterification mixture consisting essentially of (A) at least one polyol selected from the class consisting of ethylene glycol, propylene glycol, butylene glycol, diethylene glycol, dipropylene glycol, tripropylene glycol, triethylene glycol and glycerine, and (B) a carbonyl compound selected from the class consisting of maleic anhydride, phthalic anhydride, endomethylenetetrachlorophthalic anhydride, tetrachlorophthalic anhydride, tetrahydrophthalic anhydride, succinic anhydride, adipic acid, isophthalic acid, terephthalic acid, fumaric acid, maleic acid and succinic acid, by fusion cook, which method comprises:

(1) heating said mixture in a reaction zone and in the substantial absence of solvents to a temperature to effect esterification reaction between components (A) and (B) to form said polymeric polyester, attended by evolution of and evaporation of water, and also to evaporate a portion of polyol, (2) passing inert gas through said mixture at a rate determined by the formula: c.f.m.=1+K G, wherein c.f.m. equals cubic feet of said inert gas per minute, K is a constant having a value within a range of 0.001 to 0.04 and G is gallons of batch, to remove substantially all of the water as vapor as it is evolved and to take up vapors of said polyol, (3) passing the mixture of inert gas and water vapors directly from the reaction zone to a separate zone of partial condensation wherein they are cooled to a temperature in a range from slightly above the boiling point of water to about 240° F. whereby to condense out any vapors of polyol without condensing water vapor, and maintaining said zone of partial condensation substantially free of water of condensation, (4) returning the polyol condensed in said zone of partial condensation directly to said esterification mixture in the reaction zone while permitting the inert gas and water vapor in the zone of partial condensation to pass out of the system without condensation of the water vapor, and (5) continuing to return said polyol from the zone of partial condensation to the zone of esterification and to pass said inert gas containing the vapors of water from the zone of partial condensation until evolution of water substantially ceases and said esterification mixture has been carried to the desired stage and a polymeric polyester of desired acid value and viscosity is obtained.

2. A method of preparing a polymeric polyester from an esterification mixture consisting essentially of (A) at least one polyol selected from the class consisting of ethylene glycol, propylene glycol, butylene glycol, diethylene glycol, dipropylene glycol, tripropylene glycol, triethylene glycol and glycerine, and (B) an acid component comprising a mixture of a pair of dicarboxylic acids, one of which is alpha, beta-ethylentically unsaturated and the second of which is free of ethylenic groups, by fusion cook, which method comprises:

(1) heating said mixture in a reaction zone and in the substantial absence of solvents to a temperature to effect esterification reaction between components (A) and (B) to form said polymeric polyester, attended by evolution of and evaporation of water, and also to evaporate a portion of polyol, (2) passing inert gas through said mixture at a rate determined by the formula: c.f.m.=1+K G, wherein c.f.m. equals cubic feet of said inert gas per minute, K is a constant having a value within a range of 0.001 to 0.04 and G is gallons of batch, to remove substantially all of the water as vapor as it is evolved and to take up vapors of said polyol, (3) passing the mixture of inert gas and water vapors directly from the reaction zone to a separate zone of partial condensation wherein they are cooled to a temperature in a range from slightly above the boiling point of water to about 240° F. whereby to condense out any vapors of polyol without condensing water vapor, and maintaining said zone of partial condensation substantially free of water of condensation, (4) returning the polyol condensed in said zone of partial condensation directly to said esterification mixture in the reaction zone while permitting the inert gas and water vapor in the zone of partial condensation to pass out of the system without condensation of the water vapor, and (5) continuing to return said polyol from the zone of partial condensation to the zone of esterification and to pass said inert gas containing the vapors of water from the zone of partial condensation until evolution of water substantially ceases and said esterification mixture has been carried to the desired stage and a polymeric polyester of desired acid value and viscosity is obtained.

3. A method of preparing a polymeric polyester from an esterification mixture consisting essentially of (A) at least one polyol selected from the class consisting of ethylene glycol, propylene glycol, butylene glycol, diethylene glycol, dipropylene glycol, tripropylene glycol, triethylene glycol and glycerine, and (B) maleic anhydride, by fusion cook, which method comprises:

(1) heating said mixture in a reaction zone and in the substantial absence of solvents to a temperature to effect esterification reaction between components (A) and (B) to form said polymeric polyester, attended by evolution of and evaporation of water, and also to evaporate a portion of polyol, (2) passing inert gas through said mixture at a rate determined by the formula: c.f.m.=1+K G, wherein c.f.m equals cubic feet of said inert gas per minute, K is a constant having a value within a range of 0.001 to 0.04 and G is gallons of batch, to remove substantially all of the water as vapor as it is evolved and to take up vapors of said polyol, (3) passing the mixture of inert gas and water vapors directly from the reaction zone to a separate zone of partial condensation wherein they are cooled to a temperature in a range from slightly above the boiling point of water to about 240° F. whereby to condense out any vapors of polyol without condensing water vapor, and maintaining said zone of partial condensation substantially free of water of condensation, (4) returning the polyol condensed in said zone of partial condensation directly to said esterification mixture in the reaction zone while permitting the inert gas and water vapor in the zone of partial condensation to pass out of the system without condensation of the water vapor, and (5) continuing to return said polyol from the zone of partial condensation to the zone of esterification and to pass said inert gas containing the vapors of water from the zone of partial condensation until evolution of water substantially ceases and said esterification mixture has been carried to the desired stage and a polymeric polyester of desired acid value and viscosity is obtained.

4. A method of preparing a polymeric polyester from an esterification mixture consisting essentially of (A) at least one polyol selected from the class consisting of ethylene glycol, propylene glycol, butylene glycol, diethylene glycol, dipropylene glycol, tripropylene glycol, triethylene glycol and glycerine, and (B) a mixture of maleic anhydride and phthalic anhydride, by fusion cook, which method comprises:

(1) heating said mixture in a reaction zone and in the substantial absence of solvents to a temperature to effect esterification reaction between components (A) and (B) to form said polymeric polyester, attended by evolution of and evaporation of water, and also to evaporate a portion of polyol.

(2) passing inert gas through said mixture at a rate determined by the formula: c.f.m.=1+K G, wherein c.f.m. equals cubic feet of said inert gas per minute, K is a constant having a value within a range of 0.001 to 0.04 and G is gallons of batch, to remove substantially all of the water as vapor as it is evolved and to take up vapors of said polyol, (3) passing the mixture of inert gas and water vapors directly from the reaction zone to a separate zone of partial condensation wherein they are cooled to a temperature in a range from slightly above the boiling point of water to about 240° F. whereby to condense out any vapors of polyol without condensing water vapor, and maintaining said zone of partial condensation substantially free of water of condensation, (4) returning the polyol condensed in said zone of partial condensation directly to said esterification mixture in the reaction zone while permitting the inert gas and water vapor in the zone of partial condensation to pass out of the system without condensation of the water vapor, and (5) continuing to return said polyol from the zone of partial condensation to the zone of esterification and to pass said inert gas containing the vapors of water from the zone of partial condensation until evolution of water substantially ceases and said esterification mixture has been carried to the desired stage and a polymeric polyester of desired acid value and viscosity is obtained.

5. A method of preparing a polymeric polyester from an esterification mixture consisting essentially of (A) at least one polyol selected from the class consisting of ethylene glycol, propylene glycol, butylene glycol, diethylene glycol, dipropylene glycol, tripropylene glycol, triethylene glycol and glycerine, and (B) an acid component comprising equal moles of maleic anhydride and phthalic anhydride, by fusion cook, which method comprises:

(1) heating said mixture in a reaction zone and in the substantial absence of solvents to a temperature to effect esterification reaction between components (A) and (B) to form said polymeric polyester, attended by evolution of and evaporation of water, and also to evaporate a portion of polyol, (2) passing inert gas through said mixture at a rate determined by the formula: $c.f.m. = 1 + K\,G$, wherein c.f.m. equals cubic feet of said inert gas per minute, $K$ is a constant having a value within a range of 0.001 to 0.04 and $G$ is gallons of batch, to remove substantially all of the water as vapor as it is evolved and to take up vapors of said polyol, (3) passing the mixture of inert gas and water vapors directly from the reaction zone to a separate zone of partial condensation wherein they are cooled to a temperature in a range from slightly above the boiling point of water to about 240° F. whereby to condense out any vapors of polyol without condensing water vapor, and maintaining said zone of partial condensation substantially free of water of condensation, (4) returning the polyol condensed in said zone of partial condensation directly to said esterification mixture in the reaction zone while permitting the inert gas and water vapor in the zone of partial condensation to pass out of the system without condensation of the water vapor, and (5) continuing to return said polyol from the zone of partial condensation to the zone of esterification and to pass said inert gas containing the vapors of water from the zone of partial condensation until evolution of water substantially ceases and said esterification mixture has been carried to the desired stage and a polymeric polyester of desired acid value and viscosity is obtained, then increasing the flow of inert gas through the esterification mixture.

References Cited in the file of this patent

UNITED STATES PATENTS

| | | |
|---|---|---|
| 2,892,812 | Helbing | June 30, 1959 |
| 2,892,813 | Georgian | June 30, 1959 |
| 2,973,341 | Hippe et al. | Feb. 28, 1961 |